(12) United States Patent
Sugiyama et al.

(10) Patent No.: US 11,345,244 B2
(45) Date of Patent: May 31, 2022

(54) AUXILIARY POWER SUPPLY DEVICE AND ELECTRIC VEHICLE

(71) Applicant: JTEKT CORPORATION, Osaka (JP)

(72) Inventors: Toyoki Sugiyama, Kitakatsuragi-gun (JP); Koji Nishi, Anjo (JP); Shinichi Sawada, Nagoya (JP); Takumi Mio, Kariya (JP); Fumihiko Sato, Kashiwara (JP); Satoshi Shinoda, Neyagawa (JP); Yukihiro Komatsubara, Chiryu (JP)

(73) Assignee: JTEKT CORPORATION, Osaka (JP)

( * ) Notice: Subject to any disclaimer, the term of this patent is extended or adjusted under 35 U.S.C. 154(b) by 16 days.

(21) Appl. No.: 16/874,734

(22) Filed: May 15, 2020

(65) Prior Publication Data

US 2020/0369164 A1    Nov. 26, 2020

(30) Foreign Application Priority Data

May 22, 2019    (JP) .............................. JP2019-096162

(51) Int. Cl.
*B60L 50/60*    (2019.01)
*B60L 50/61*    (2019.01)
*H02J 7/14*    (2006.01)

(52) U.S. Cl.
CPC ............... *B60L 50/66* (2019.02); *B60L 50/61* (2019.02); *H02J 7/14* (2013.01)

(58) Field of Classification Search
CPC .................................. B60L 50/66; B60L 50/61
See application file for complete search history.

(56) References Cited

U.S. PATENT DOCUMENTS

| | | | |
|---|---|---|---|
| 6,218,643 B1* | 4/2001 | Iwata | H02J 7/1438 219/202 |
| 2007/0262649 A1* | 11/2007 | Ozawa | B60R 16/03 307/64 |
| 2016/0090052 A1* | 3/2016 | Nishijima | B60R 16/0238 307/9.1 |
| 2017/0361712 A1 | 12/2017 | Terao et al. | |

FOREIGN PATENT DOCUMENTS

JP    2017-225241 A    12/2017

* cited by examiner

*Primary Examiner* — Daniel Kessie
(74) *Attorney, Agent, or Firm* — Oblon, McClelland, Maier & Neustadt, L.L.P.

(57) ABSTRACT

An auxiliary power supply device includes an auxiliary power supply; and an auxiliary power supply control unit configured to switch a mode of the auxiliary power supply to an output mode or a non-output mode when electric power is output from a main power supply to a drive motor. The auxiliary power supply control unit is configured to switch the mode to the non-output mode when a required power value required by the drive motor is equal to or smaller than a predetermined power value and to switch the mode to the output mode when the required power value is larger than the predetermined power value, the predetermined power value being set to a value smaller than outputtable electric power that is electric power outputtable from the main power supply.

7 Claims, 4 Drawing Sheets

AUXILIARY POWER SUPPLY DEVICE AND ELECTRIC VEHICLE

CROSS-REFERENCE TO RELATED APPLICATION

This application claims priority to Japanese Patent Application No. 2019-096162 filed on May 22, 2019, incorporated herein by reference in its entirety.

BACKGROUND

1. Technical Field

The disclosure relates to an auxiliary power supply device and an electric vehicle.

2. Description of Related Art

Japanese Unexamined Patent Application Publication No. 2017-225241 (JP 2017-225241 A) discloses an electric vehicle including an auxiliary battery that is a main power supply and a backup power supply. In this electric vehicle, the main power supply outputs electric power to a drive motor such that the drive motor rotates vehicle wheels. This main power supply is a rechargeable battery and is charged with electric power from a generator. In this electric vehicle, when the electric power output from the main power supply to the drive motor is stopped, the backup power supply outputs electric power to the drive motor, instead of the main power supply.

SUMMARY

In the above electric vehicle, the electric power output from the main power supply may become larger than the electric power required by the drive motor. In this case, power consumption in the main power supply increases as compared to the case where the electric power required by the drive motor is output from the main power supply. It cannot be said that measures are taken to reduce power consumption in the main power supply in the electric vehicle disclosed in JP 2017-225241 A.

A first aspect of the disclosure relates to an auxiliary power supply device configured to be mounted in an electric vehicle including a drive motor configured to generate a driving force required for the electric vehicle to travel, and a main power supply configured to output electric power to the drive motor such that the electric vehicle travels. The auxiliary power supply device includes an auxiliary power supply configured to output the electric power along a flow of the electric power from the main power supply to the drive motor; and an auxiliary power supply control unit configured to switch a mode of the auxiliary power supply to an output mode or a non-output mode when the electric power is output from the main power supply to the drive motor, the output mode being a mode in which the electric power is output from the auxiliary power supply, and the non-output mode being a mode in which the electric power is not output from the auxiliary power supply. The auxiliary power supply control unit is configured to switch the mode to the non-output mode when a required power value required by the drive motor is equal to or smaller than a predetermined power value and to switch the mode to the output mode when the required power value is larger than the predetermined power value, the predetermined power value being set to a value smaller than outputtable electric power that is electric power outputtable from the main power supply.

With the above configuration, even in a situation where the electric power that can be output from the main power supply is large enough, the auxiliary power supply can output the electric power according to a value by which the electric power output from the main power supply exceeds the predetermined power value. Accordingly, power consumption in the main power supply can be reduced even when an event occurs such that the required power value required by the drive motor suddenly increases in the situation where the electric power that can be output from the main power supply is large enough.

In the above auxiliary power supply device, in the non-output mode, the auxiliary power supply may be charged with the electric power output from the main power supply. In the above configuration, the auxiliary power supply can be charged while the main power supply is outputting the electric power to the drive motor. A power supply path from the main power supply to the drive motor thus also serves as a part of a charging path for the auxiliary power supply. This contributes to simplification of power supply paths.

In the above auxiliary power supply device, in the non-output mode, the auxiliary power supply may be charged with the electric power that is generated by a generator based on operation of an engine. In the above configuration, since the auxiliary power supply is charged with the electric power that is generated by the generator, the auxiliary power supply can continue to be charged while the engine continues to be driven (i.e., the engine continues to operate).

A second aspect of the disclosure relates to an electric vehicle including the auxiliary power supply device; a main power supply device including the main power supply and a main power supply control unit configured to control output of the electric power from the main power supply to the drive motor; and the drive motor.

With the above configuration, in the output mode, the auxiliary power supply outputs the electric power along the flow of the electric power from the main power supply to the drive motor. Therefore, the electric power output from the main power supply can be reduced as compared to the case where only the main power supply outputs electric power to the drive motor. Accordingly, even in a situation where the electric power that is output from the main power supply becomes larger than the required power value required by the drive motor, the auxiliary power supply outputs the electric power according to a value by which the required power value exceeds the predetermined power value. It is possible to provide the electric vehicle in which power consumption is reduced.

The electric vehicle may further include an engine; and a generator configured to generate the electric power based on operation of the engine. At least one of the main power supply and the auxiliary power supply may be charged with the electric power generated by the generator.

With the above configuration, at least one of the main power supply and the auxiliary power supply is charged with the electric power generated by the generator. Accordingly, it is possible to provide the electric vehicle in which at least one of the main power supply and the auxiliary power supply continues to be charged while the engine continues to be driven (i.e., while the engine continues to operate).

The auxiliary power supply device and the electric vehicle according to the above aspects of the disclosure reduce power consumption in the main power supply.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
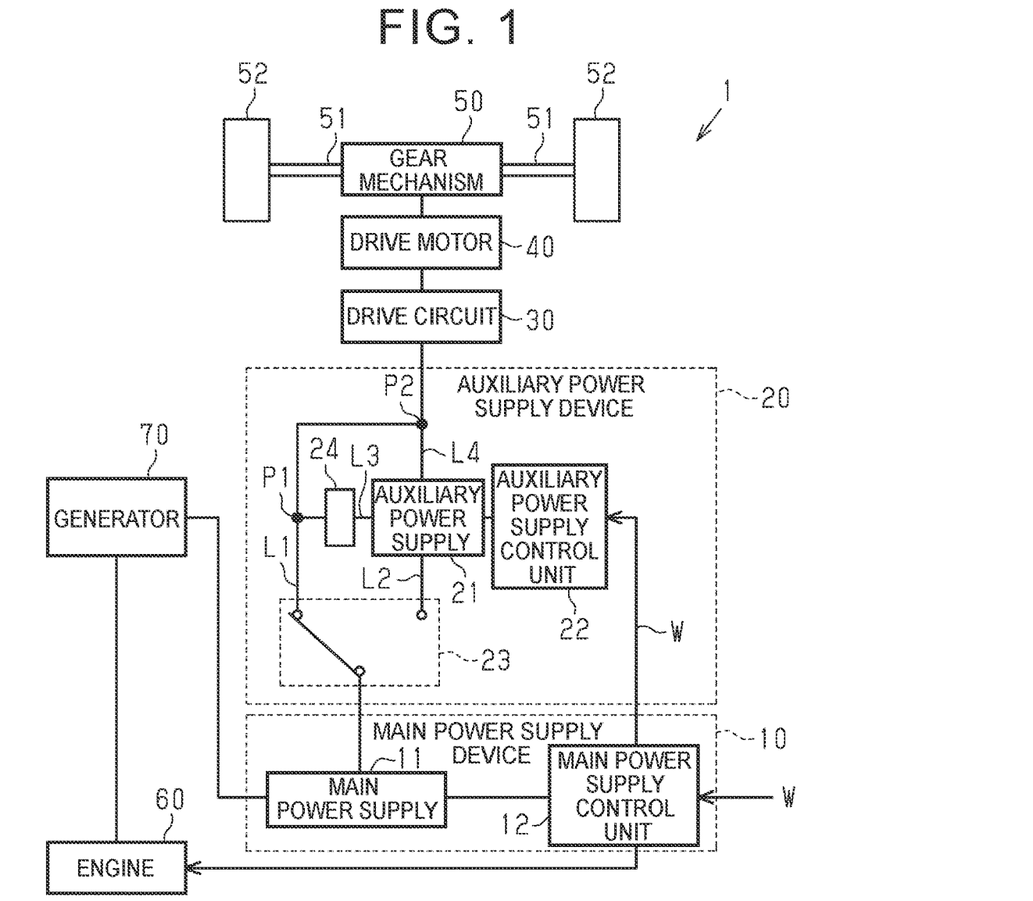
FIG. 1 schematically illustrates a configuration of an electric vehicle including an auxiliary power supply device.

A first embodiment in which an auxiliary power supply device is applied to an electric vehicle will be described. As shown in FIG. 1, an electric vehicle 1 includes a main power supply device 10, an auxiliary power supply device 20, a drive circuit 30, a drive motor 40, a gear mechanism 50, an engine 60, and a generator 70. The electric vehicle 1 is capable of traveling using the drive motor 40 as a driving source. The drive motor 40 is driven using electric power that is output from the main power supply device 10. The electric vehicle 1 is a range extender electric vehicle.

An output shaft of the drive motor 40 is coupled to the gear mechanism 50. The drive motor 40 generates a driving force that is required for the electric vehicle 1 to travel. The gear mechanism 50 is connected to right and left drive shafts 51. Each drive shaft 51 has its one end connected to the gear mechanism 50 and the other end connected to a corresponding one of wheels 52. The driving force of the drive motor 40 is transmitted to the wheels 52 via the gear mechanism 50 and the drive shafts 51. The main power supply device 10 is connected to the auxiliary power supply device 20, the auxiliary power supply device 20 is connected to the drive circuit 30, and the drive circuit 30 is connected to the drive motor 40.

The engine 60 is connected to the generator 70. The engine 60 is used for electric power generation performed by the generator 70. In the first embodiment, the engine 60 is a gasoline engine that is driven using gasoline as fuel. The generator 70 is connected to the main power supply device 10. The generator 70 generates electric power based on the driving force of the engine 60. The electric power generated by the generator 70 is output to the main power supply device 10. The electric power generated by the generator 70 is used to charge the main power supply device 10.

The main power supply device 10 includes a main power supply 11 and a main power supply control unit 12. The main power supply 11 is a power supply that can be charged with electric power and can discharge electric power. The main power supply 11 is, for example, a lithium ion battery. The main power supply 11 outputs electric power to the drive motor 40 that is a power supply target to be supplied with electric power. The main power supply control unit 12 is connected to an external control device via a communication line such as Controller Area Network (CAN) communication and obtains information that is output from the external control device. The external control device calculates as this information a required power value W, which is the electric power required by the drive motor 40, and outputs the required power value W to the main power supply control unit 12 via the CAN communication. The main power supply control unit 12 controls operation of the drive circuit 30 based on the required power value W to control the electric power that is output from the main power supply 11 to the drive motor 40. The main power supply control unit 12 obtains information such as the remaining electric power of the main power supply 11. The main power supply control unit 12 outputs a signal for starting the engine 60 to the engine 60 such that the remaining electric power of the main power supply 11 does not become smaller than its lower limit. The lower limit of the remaining electric power of the main power supply 11 is the lower limit value of the remaining electric power at which the progress of deterioration of the main power supply 11 is restrained or reduction in maximum capacity of the main power supply 11 is restrained by outputting electric power from the main power supply 11. The lower limit of the remaining electric power of the main power supply 11 is set based on experiments etc. The main power supply control unit 12 starts the driving (operation) of the engine 60 by outputting a signal for starting the engine 60 to the engine 60. The generator 70 thus generates electric power for charging based on the driving force of the engine 60. When a sufficient amount of electric power remains in the main power supply 11, the main power supply control unit 12 stops the driving (operation) of the engine 60 by outputting a signal for stopping the engine 60 to the engine 60.

The auxiliary power supply device 20 includes an auxiliary power supply 21, an auxiliary power supply control unit 22, a switch 23, and a step-up circuit 24. The auxiliary power supply 21 is a power supply that can be charged with electric power, and can discharge electric power. The auxiliary power supply 21 is, for example, a lithium ion capacitor. Lithium ion capacitors are advantageous in that lithium ion capacitors have high heat resistance, long life, good charge and discharge performance, and high energy density, and are highly safe. Particularly, lithium ion capacitors have characteristics that lithium ion capacitors can be charged and discharged a much larger number of times and have longer life as compared to lithium ion batteries. The auxiliary power supply 21 is charged with electric power output from the main power supply 11 such that the remaining electric power of the auxiliary power supply 21 does not become smaller than its lower limit. The lower limit of the remaining electric power of the auxiliary power supply 21 is the lower limit value of the remaining electric power at which the progress of deterioration of the auxiliary power supply 21 is restrained or reduction in maximum capacity of the auxiliary power supply 21 is restrained by outputting electric power from the auxiliary power supply 21. The lower limit of the remaining electric power of the auxiliary power supply 21 is set based on experiments etc. The auxiliary power supply 21 has its one end connected to the drive circuit 30. The auxiliary power supply 21 outputs electric power along the flow of electric power from the main power supply 11 to the drive motor 40 by outputting electric power to the drive circuit 30.

The auxiliary power supply control unit 22 is connected to the main power supply control unit 12 via the communication line such as CAN communication and obtains the required power value W from the main power supply control unit 12. The auxiliary power supply control unit 22 is an electronic control unit (ECU) including a processor etc., and the main power supply control unit 12 is also an ECU including a processor etc. When the main power supply 11 outputs electric power to the drive motor 40, the auxiliary power supply control unit 22 switches the operation mode of the auxiliary power supply 21 to an output mode or a non-output mode. The output mode is the mode in which the auxiliary power supply 21 outputs electric power, and the non-output mode is the mode in which the auxiliary power supply 21 does not output electric power. The auxiliary power supply control unit 22 controls the state of the switch 23 to switch the mode of the auxiliary power supply 21 to the output mode or the non-output mode. The non-output mode includes a charging and non-output mode and a non-charging and non-output mode. The charging and non-output mode is the non-output mode in which the auxiliary power supply 21 is charged. The non-charging and non-output mode is the non-output mode in which the auxiliary power supply 21 is not charged.

The switch 23 includes a plurality of switching elements. The switch 23 is configured such that a first end thereof is connected to the main power supply 11 and a second end thereof is switchably connected to a first supply path L1 or a second supply path L2. The first supply path L1 is an electric power supply path from the main power supply 11 to the drive motor 40, which connects the main power supply 11 and the drive circuit 30. A third supply path L3 is connected to a connection point P1 on the first supply path L1. The auxiliary power supply 21 is connected to the connection point P1 on the first supply path L1 by the third supply path L3. The step-up circuit 24 is provided on the third supply path L3. The step-up circuit 24 steps up the voltage of input electric power. When the second end of the switch 23 is connected to the first supply path L1 and the non-charging and non-output mode in which the auxiliary power supply 21 is not charged is established, the main power supply 11 and the drive circuit 30 are connected by the first supply path L1, and electric power supply along the third supply path L3 that connects the auxiliary power supply 21 and the first supply path L1 is cut off. When the second end of the switch 23 is connected to the first supply path L1 and the charging and non-output mode in which the auxiliary power supply 21 is charged is established, conduction is established to supply electric power along the third supply path L3 that connects the auxiliary power supply 21 and the first supply path L1. That is, the part of the first supply path L1 that is located between the connection point P1 and the main power supply 11 also functions as a part of the charging path in the charging and non-output mode. Namely, the first supply path L1 is also used as a part of the charging path. When the second end of the switch 23 is connected to the first supply path L1 and the charging and non-output mode of the auxiliary power supply 21 is established, the lower potential side of the auxiliary power supply 21 is connected to the third supply path L3 and the higher potential side thereof is grounded. Since the first supply path L1 and the third supply path L3 are connected in parallel, the voltage of electric power flowing through the first supply path L1, that is, the voltage at the same potential as the voltage of the electric power from the main power supply 11, is input to the step-up circuit 24. The step-up circuit 24 steps up the voltage at the same potential as the voltage of the electric power from the main power supply 11 and outputs the stepped up voltage to the auxiliary power supply 21. The connection state of the auxiliary power supply 21 is switched by switching the state of the switching elements of the switch 23.

The second supply path L2 is an electric power supply path that connects the main power supply 11 and the auxiliary power supply 21. A fourth supply path L4 is connected to a connection point P2 located between the connection point P1 on the first supply path L1 and the drive circuit 30. The auxiliary power supply 21 is connected to the connection point P2 on the first supply path L1 by the fourth supply path L4. When the second end of the switch 23 is connected to the second supply path L2, the main power supply 11 and the auxiliary power supply 21 are connected in series by the first supply path L1 and the second supply path L2. When the second end of the switch 23 is connected to the second supply path L2, the auxiliary power supply 21 and the drive circuit 30 are connected by the fourth supply path L4 and the first supply path L1.

To establish the non-charging and non-output mode or the charging and non-output mode of the auxiliary power supply 21, the auxiliary power supply control unit 22 connects the second end of the switch 23 to the first supply path L1. In the output mode of the auxiliary power supply 21, the auxiliary power supply control unit 22 connects the second end of the switch 23 to the second supply path L2.

The drive circuit 30 is a known circuit including two switching elements for each phase (U phase, V phase, W phase) of the drive motor 40. The drive motor 40 is driven based on the electric power received via the drive circuit 30. The driving force from the drive motor 40 is transmitted to the wheels 52 via the gear mechanism 50 and the drive shafts 51, and thus, the wheels 52 are rotated.

The flow of a process that is executed by the auxiliary power supply control unit 22 will be described with reference to FIG. 2. The process flow illustrated in FIG. 2 is implemented by the auxiliary power supply control unit 22 executing periodic processing in every control cycle.

Figure 2:
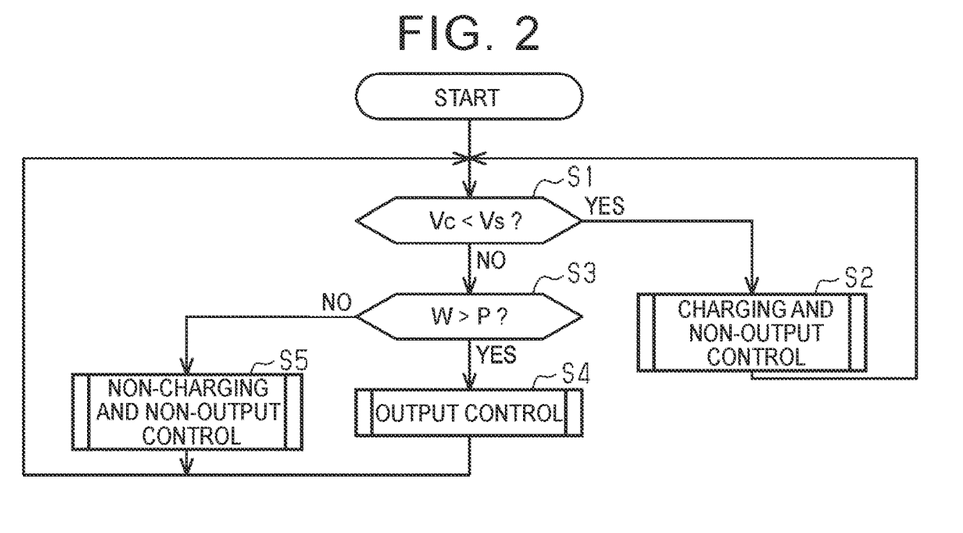
FIG. 2 is a flowchart of a process that is executed by an auxiliary power supply control unit according to a first embodiment.

The process of FIG. 2 is executed by the auxiliary power supply control unit 22. This process is started when a start switch for starting the electric vehicle 1 is turned on, and is ended when the start switch is turned off. It is herein assumed that the mode of the auxiliary power supply 21 is the non-charging and non-output mode at the start of the process. In this case, the second end of the switch 23 is connected to the first supply path L1, and electric power supply along the third supply path L3 is cut off. The required power value W calculated by the external control device is also output to the main power supply control unit 12. The process illustrated in FIG. 2 is thus executed while the main power supply 11 outputs electric power to the drive circuit 30. The main power supply 11 is charged using the electric power generated by the generator 70 such that the remaining electric power of the main power supply 11 does not become smaller than its lower limit. The main power supply 11 is charged so as to have a certain amount of remaining electric power that allows the auxiliary power supply control unit 22 to execute the process illustrated in FIG. 2.

As shown in FIG. 2, the auxiliary power supply control unit 22 determines whether an auxiliary power supply voltage Vc is lower than a charging lower limit voltage Vs (step S1). The auxiliary power supply voltage Vc is the voltage of electric power from the auxiliary power supply 21, and the charging lower limit voltage Vs is the lower limit of the voltage of the auxiliary power supply 21. The auxiliary power supply voltage Vc indicates the remaining electric power of the auxiliary power supply 21, and the charging lower limit voltage Vs indicates the lower limit of the remaining electric power of the auxiliary power supply 21. The auxiliary power supply control unit 22 stores the charging lower limit voltage Vs therein.

When the auxiliary power supply voltage Vc is lower than the charging lower limit voltage Vs (YES in step S1), the auxiliary power supply control unit 22 performs charging and non-output control (step S2). The routine executed by the auxiliary power supply control unit 22 returns to step S1 after step S2. The charging and non-output control is control that switches the mode of the auxiliary power supply 21 to the charging and non-output mode. In this case, the second end of the switch 23 is connected to the first supply path L1 such that the main power supply 11 and the drive circuit 30 are connected by the first supply path L1, and conduction is established to supply electric power along the third supply path L3. In the charging and non-output control, the auxiliary power supply control unit 22 steps up the voltage of the electric power from the main power supply 11 with the use of the step-up circuit 24 and applies the stepped up voltage to the auxiliary power supply 21 to charge the auxiliary power supply 21.

When the auxiliary power supply voltage Vc is equal to or higher than the charging lower limit voltage Vs (NO in step S1), the auxiliary power supply control unit 22 determines whether the required power value W is larger than a predetermined power value P (step S3). The predetermined power value P is a threshold for determining whether to perform output control. The predetermined power value P is experimentally calculated based on factors such as the level of reduction indicating to what extent power consumption in the main power supply 11 needs to be reduced, the maximum output capacity of the auxiliary power supply 21, and the maximum output capacity of the main power supply 11. The predetermined power value P is set to a value smaller than (an upper limit of) outputtable electric power that is electric power outputtable from the main power supply 11. In the first embodiment, the predetermined power value P is set to, for example, approximately half the outputtable electric power that is electric power outputtable from the main power supply 11. The auxiliary power supply control unit 22 stores the predetermined power value P therein.

When the required power value W is larger than the predetermined power value P (YES in step S3), the auxiliary power supply control unit 22 performs output control (step S4). The output control is control that switches the mode of the auxiliary power supply 21 to the output mode. In the output control, the auxiliary power supply control unit 22 switches the state of the switch 23 to switch the mode of the auxiliary power supply 21 to the output mode. In this case, the second end of the switch 23 is connected to the second supply path L2 such that the auxiliary power supply 21 and the main power supply 11 are connected in series. Electric power is thus output from the main power supply 11 to the drive circuit 30, and electric power is also output from the auxiliary power supply 21 to the drive circuit 30 to increase the voltage of the electric power that is output from the main power supply 11 to the drive circuit 30 so as to satisfy the required power value W. As described above, the auxiliary power supply 21 outputs electric power along the flow of electric power from the main power supply 11 to the drive motor 40, and the combined electric power, which is obtained by combining electric power output from the main power supply 11 and electric power output from the auxiliary power supply 21, is output toward the drive circuit 30.

The routine executed by the auxiliary power supply control unit 22 returns to step S1 after step S4. When the required power value W is equal to or smaller than the predetermined power value P (NO in step S3), the auxiliary power supply control unit 22 performs non-charging and non-output control (step S5). The non-charging and non-output control is control that switches the mode of the auxiliary power supply 21 to the non-charging and non-output mode. In the non-charging and non-output control, the auxiliary power supply control unit 22 switches the state of the switch 23 to switch the mode of the auxiliary power supply 21 to the non-charging and non-output mode. In this case, the second end of the switch 23 is connected to the first supply path L1 such that the main power supply 11 and the drive circuit 30 are connected by the first supply path L1 and electric power supply along the third supply path L3 is cut off. Accordingly, the main power supply 11 outputs electric power to the drive motor 40, and the auxiliary power supply 21 does not output electric power to the drive circuit 30.

The routine executed by the auxiliary power supply control unit 22 returns to step S1 after step S5. The process illustrated in FIG. 2 is ended by an interrupt when the electric vehicle 1 is turned off by turning off the start switch.

Figure 3:
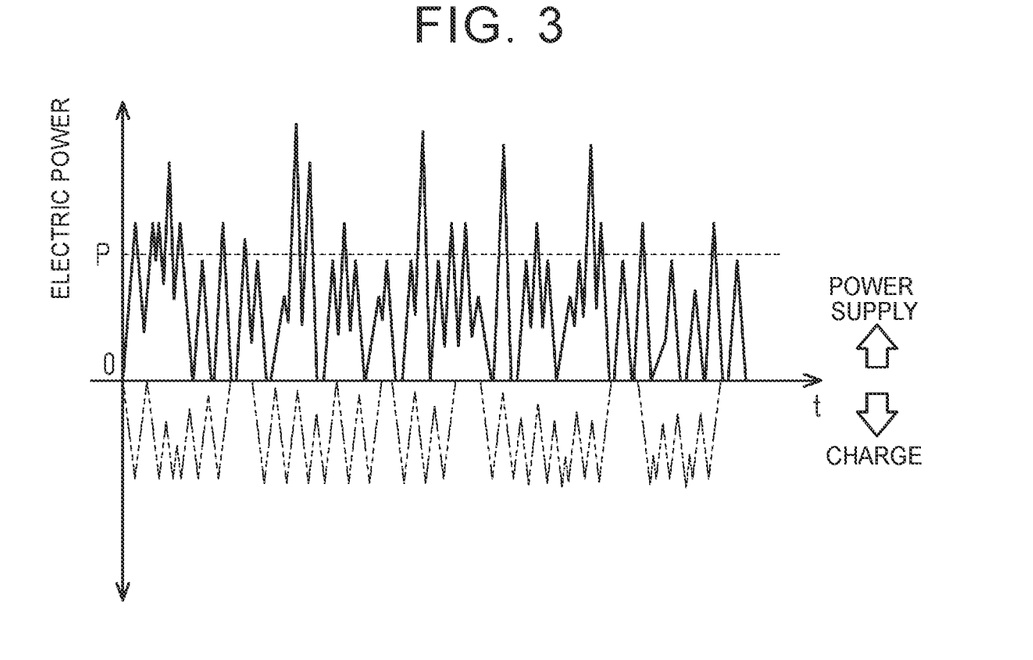
FIG. 3 is a graph illustrating how output of electric power and charging of electric power change in a comparative example.
Figure 4:
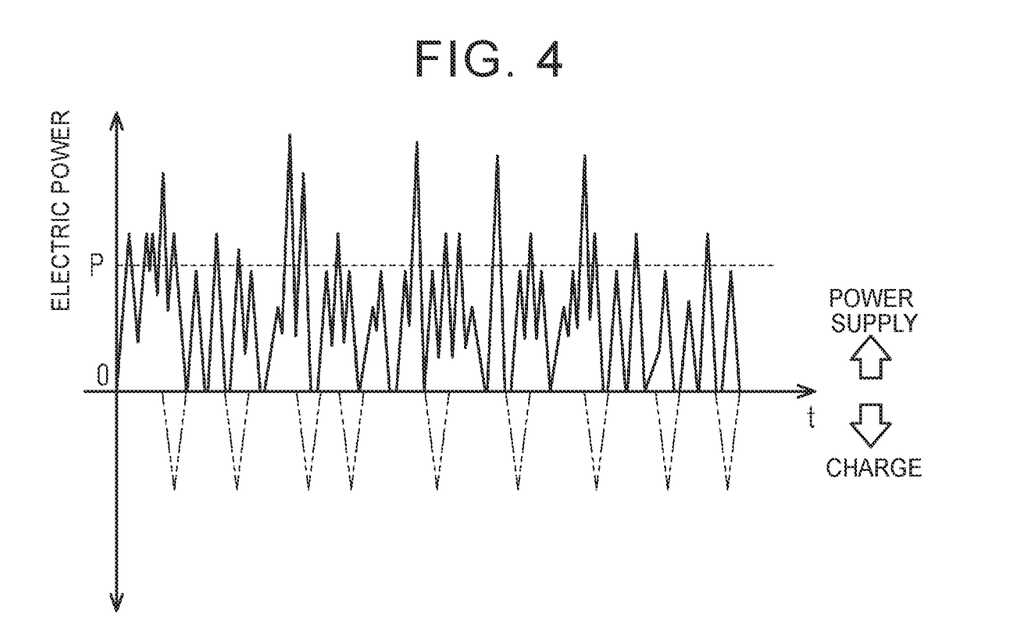
FIG. 4 is a graph illustrating how output of electric power and charging of electric power change in a first embodiment.

Operation in the present embodiment will be described. FIG. 3 is a graph illustrating a comparative example, and FIG. 4 is a graph illustrating the first embodiment. An electric vehicle of the comparative example does not include the auxiliary power supply device 20 shown in FIG. 1 and is configured such that only the main power supply 11 outputs electric power to the drive motor 40. In FIG. 3, each peak on the power supply side indicates that electric power corresponding to the peak is output from the main power supply 11, and each peak on the charge side indicates that the main power supply 11 is charged with electric power corresponding to the peak.

As shown in FIG. 3, in the comparative example, even when the required power value W is larger than the predetermined power value P, the main power supply 11 outputs all the electric power corresponding to the required power value W. Accordingly, if the main power supply 11 outputs electric power larger than the required power value W, power consumption (i.e., consumed electric power) in the main power supply 11 is increased as compared to the case where the main power supply 11 outputs electric power according to the required power value W. In this case, due to the increase in the power consumption in the main power supply 11, the main power supply 11 needs to be more frequently charged such that the remaining electric power of the main power supply 11 does not become smaller than its lower limit. Therefore, the engine 60 needs to be started more frequently such that the generator 70 generates electric power for charging based on the driving force of the engine 60.

As shown in FIGS. 1 and 4, in the first embodiment, when the required power value W is larger than the predetermined power value P, the auxiliary power supply control unit 22 connects the second end of the switch 23 to the second supply path L2 to switch the mode of the auxiliary power supply 21 to the output mode. The main power supply 11 and the auxiliary power supply 21 are thus connected in series. Thus, the main power supply 11 outputs electric power to the drive circuit 30, and the auxiliary power supply 21 also outputs electric power toward the drive circuit 30 so as to increase the voltage of the electric power output from the main power supply 11 to the drive circuit 30. The auxiliary power supply 21 outputs the electric power corresponding to a value by which the required power value W is larger than the predetermined power value P (in other words, the auxiliary power supply 21 outputs the electric power corresponding to a value by which the required power value W exceeds the predetermined power value P, i.e., the auxiliary power supply 21 outputs the electric power corresponding to the difference between the required power value W and the predetermined power value P). That is, the main power supply 11 and the auxiliary power supply 21 output the electric power corresponding to the required power value W. Electric power, which is output from the auxiliary power supply 21 according to the value by which the required power value W is larger than the predetermined power value P shown in FIG. 4, varies depending on the situation. Therefore, the auxiliary power supply 21 may output electric power equal to or larger than the electric power corresponding to the value by which the required power value W is larger than the predetermined power value P shown in FIG. 4. Accordingly, electric power equal to or larger than the required power value W may be output toward the drive circuit 30. However, in the present embodiment, since the main power supply 11 and the auxiliary power supply 21 output the electric power corresponding to the required power value W, it is possible to reduce the possibility that electric power equal to or larger than the required power value W is output, as compared to the case where only the main power supply 11 outputs the electric power corresponding to the required power value W.

Figure 5:
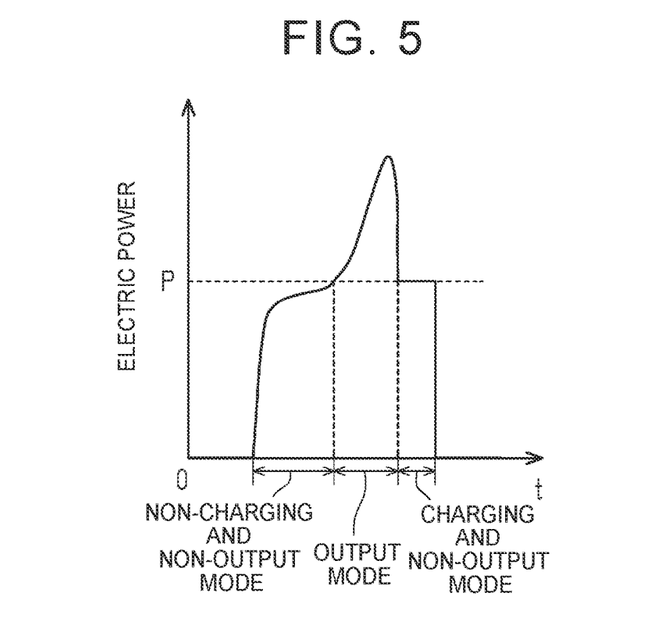
FIG. 5 is a graph schematically illustrating an example of transition among a no-charging and non-output mode, a charging and non-output mode, and an output mode.

FIG. 5 schematically illustrates an example of transition among the non-charging and non-output mode, the charging and non-output mode, and the output mode. As shown in FIGS. 1 and 5, when the required power value W is equal to or smaller than the predetermined power value P, the auxiliary power supply control unit 22 performs the non-charging and non-output control to switch the mode of the auxiliary power supply 21 to the non-charging and non-output mode. In this case, the main power supply 11 outputs all the electric power corresponding to the required power value W.

When the required power value W is larger than the predetermined power value P, the auxiliary power supply control unit 22 performs the output control to switch the mode of the auxiliary power supply 21 to the output mode. In this case, the main power supply 11 outputs the electric power corresponding to the predetermined power value P out of the electric power according to the required power value W, and the auxiliary power supply 21 outputs the electric power according to the value by which the required power value W is larger than the predetermined power value P.

When the auxiliary power supply voltage Vc is lower than the charging lower limit voltage Vs, the auxiliary power supply control unit 22 performs the charging and non-output control to switch the mode of the auxiliary power supply 21 to the charging and non-output mode. Since the remaining electric power of the auxiliary power supply 21 decreases during the output control, this charging control is often performed after the output control. In this charging and non-output control, the auxiliary power supply 21 is charged with the electric power output from the main power supply 11.

Effects of the first embodiment will be described. In the output mode that is established when the required power value W is larger than the predetermined power value P, the auxiliary power supply 21 outputs electric power along the flow of electric power from the main power supply 11 to the drive motor 40. That is, even in a situation where the electric power that can be output from the main power supply 11 is large enough, the auxiliary power supply 21 can output the electric power according to the value by which the electric power from the main power supply 11 exceeds the predetermined power value P. Accordingly, power consumption in the main power supply 11 can be reduced even when an event occurs such that the required power value W required by the drive motor 40 suddenly increases in the situation where the electric power that can be output from the main power supply 11 is large enough.

Since the power consumption in the main power supply 11 can be reduced, the main power supply 11 needs to be less frequently charged such that the remaining electric power of the main power supply 11 does not become smaller than its lower limit. The generator 70 therefore needs to generate electric power for charging less frequently. It is possible to provide the electric vehicle 1 in which power consumption in the main power supply 11 is reduced as compared to the comparative example. Fuel efficiency of the electric vehicle 1 is thus improved.

In the charging and non-output mode, the auxiliary power supply 21 can be charged while the main power supply 11 is outputting electric power to the drive motor 40. The first supply path L1 thus also serves as a part of a charging path for the auxiliary power supply 21. This contributes to simplification of the power supply paths.

If the auxiliary power supply 21 is provided on the first supply path L1 and the drive circuit 30 and the auxiliary power supply 21 are connected in series, the voltage of electric power that is output from the main power supply 11 in the charging and non-output mode is divided into the voltage of electric power that flows into the auxiliary power supply 21 for charging and the voltage of electric power that is output to the drive circuit 30. That is, the voltage of the electric power that flows into the auxiliary power supply 21 may be lower than that of the electric power that is output from the main power supply 11. In this regard, in the charging and non-output mode of the present embodiment, since the first supply path L1 and the third supply path L3 are connected in parallel, the voltage of electric power that flows into the third supply path L3 is the same as that of electric power that is output from the main power supply 11. Since the auxiliary power supply 21 is a capacitor, the electric power for charging the auxiliary power supply 21 increases in proportion to the input voltage. The auxiliary power supply 21 is charged more efficiently in the charging and non-output mode as compared to the case where the auxiliary power supply 21 is provided on the first supply path L1.

In the charging and non-output mode, a voltage at the same potential as the voltage of the electric power from the main power supply 11 is applied to the step-up circuit 24 on the third supply path L3. A voltage that is applied to the auxiliary power supply 21 is obtained by stepping up the voltage of the electric power from the main power supply 11 with the use of the step-up circuit 24 (in other words, the voltage of the electric power from the main power supply 11 is stepped up by the step-up circuit 24, and then, the stepped-up voltage is applied to the auxiliary power supply 21). Since the auxiliary power supply 21 is a capacitor, the electric power for charging the auxiliary power supply 21 increases in proportion to the input voltage. Since the auxiliary power supply 21 is charged based on the voltage stepped up by the step-up circuit 24, the electric power for charging the auxiliary power supply 21 is larger than that in the case where the auxiliary power supply 21 is charged with the voltage of the electric power from the main power supply 11. Accordingly, the auxiliary power supply 21 is charged more efficiently during the charging and non-output control as compared to the case where the step-up circuit 24 is not provided.

Since the main power supply 11 is charged with the electric power generated by the generator 70, it is possible to provide the electric vehicle 1 in which the main power supply 11 continues to be charged while the engine 60 continues to be driven (i.e., while the engine 60 continues to operate). Since the auxiliary power supply 21 is charged with the electric power from the main power supply 11, it is possible to provide the electric vehicle 1 in which the auxiliary power supply 21 can be charged.

In FIG. 2, step S1 is first performed to determine whether to perform the charging and non-output control. Accordingly, the auxiliary power supply 21 basically has been charged when the output control of step S4 is performed. Thus, it is possible to reduce the possibility that there is no remaining electric power in the auxiliary power supply 21 even though the determination result of step S3 is YES and the output control should be performed.

A second embodiment in which the auxiliary power supply device is applied to an electric vehicle will be described. The differences from the first embodiment will be mainly described below. In the second embodiment, the auxiliary power supply control unit 22 executes a process shown in FIG. 6 instead of that shown in FIG. 2.

Figure 6:
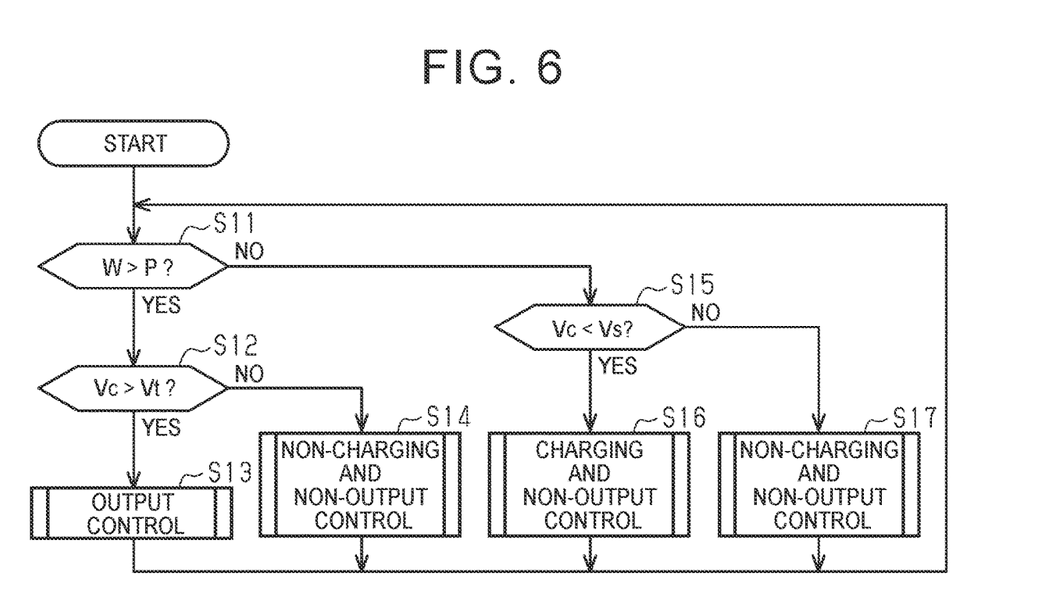
FIG. 6 is a flowchart of a process that is executed by the auxiliary power supply control unit according to a second embodiment.

As shown in FIG. 6, the auxiliary power supply control unit 22 determines whether the required power value W is larger than the predetermined power value P (step S11). Step S11 is a process that is the same as or similar to step S3.

When the required power value W is larger than the predetermined power value P (YES in step S11), the auxiliary power supply control unit 22 determines whether the auxiliary power supply voltage Vc is higher than an output control lower limit threshold Vt (step S11). Step S12 is a process for preventing a situation where output control that switches the mode of the auxiliary power supply 21 to the output mode is performed when electric power cannot be output from the auxiliary power supply 21 to the drive circuit 30. The output control lower limit threshold Vt is the lower limit value of the auxiliary power supply voltage Vc at which the progress of deterioration of the auxiliary power supply 21 is restrained or the reduction in maximum capacity of the auxiliary power supply 21 is restrained by performing the output control. The output control lower limit threshold Vt is set to a value lower than the charging lower limit voltage Vs. The auxiliary power supply control unit 22 stores the output control lower limit threshold Vt therein.

When the auxiliary power supply voltage Vc is higher than the output control lower limit threshold Vt (YES in step S12), the auxiliary power supply control unit 22 performs the output control (step S13). The output control in step S13 is a process that is the same as or similar to the output control in step S4. The routine executed by the auxiliary power supply control unit 22 returns to step S11 after step S13.

When the auxiliary power supply voltage Vc is equal to or lower than the output control lower limit threshold Vt (NO in step S12), the auxiliary power supply control unit 22 performs non-charging and non-output control (step S14). The non-charging and non-output control in step S14 is a process that is the same as or similar to the non-charging and non-output control in step S5. The routine executed by the auxiliary power supply control unit 22 returns to step S11 after step S14.

When the required power value W is equal to or smaller than the predetermined power value P (NO in step S11), the auxiliary power supply control unit 22 determines whether the auxiliary power supply voltage Vc is lower than the charging lower limit voltage Vs (step S15). Step S15 is a process that is the same as or similar to step S1.

When the auxiliary power supply voltage Vc is lower than the charging lower limit voltage Vs (YES in step S15), the auxiliary power supply control unit 22 performs the charging and non-output control (step S16). The charging and non-output control of step S16 is a process similar to the charging and non-output control of step S2. The routine by the auxiliary power supply control unit 22 returns to step S11 after step S16.

When the auxiliary power supply voltage Vc is equal to or higher than the charging lower limit voltage Vs (NO in step S15), the auxiliary power supply control unit 22 performs non-charging and non-output control (step S17). The non-charging and non-output control in step S17 is a process that is the same as or similar to the non-charging and non-output control in step S14 and the non-charging and non-output control in step S5.

The process shown in FIG. 6 is ended by an interrupt when the electric vehicle 1 is turned off by turning off the start switch. According to the second embodiment described above, effects similar to those of the first embodiment can be obtained even when the auxiliary power supply control unit 22 executes the process shown in FIG. 6.

The above embodiments may be modified as follows. The following other embodiments may be combined as long as no technical inconsistency occurs. In the charging and non-output mode, the auxiliary power supply 21 is charged with the electric power output from the main power supply 11. However, the disclosure is not limited to this. For example, the auxiliary power supply 21 may be charged with the electric power generated by the generator 70, similarly to the main power supply 11. The main power supply 11 may not be charged with the electric power generated by the generator 70, and only the auxiliary power supply 21 may be charged with the electric power generated by the generator 70.

The charging and non-output control may be performed in step S14 of FIG. 6. The step-up circuit 24 may not be provided on the third supply path L3. The switch 23 may be provided outside the auxiliary power supply device 20.

The required power value W from the external control device may be input to both the main power supply control unit 12 and the auxiliary power supply control unit 22 or may be input to only the auxiliary power supply control unit 22.

Figure 7:
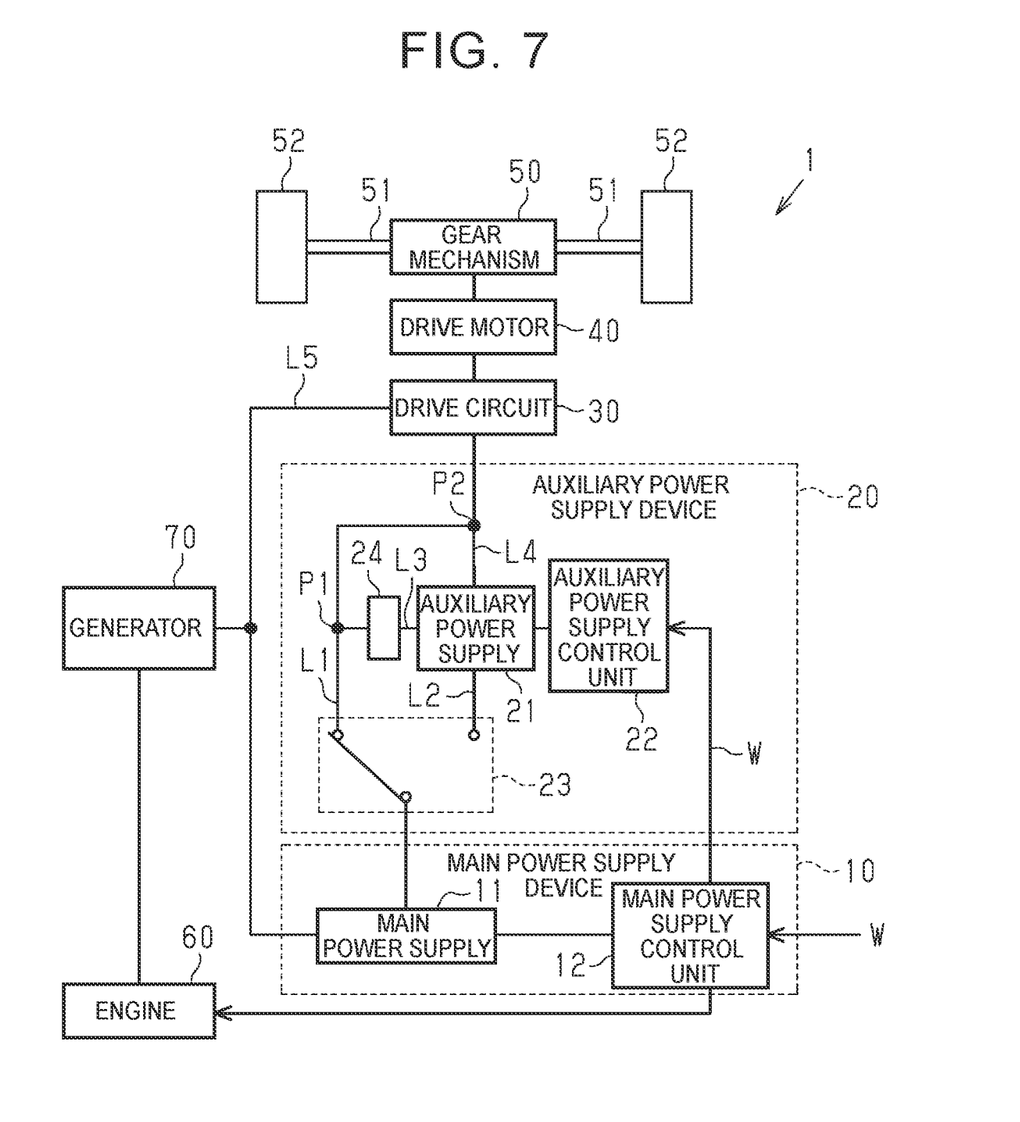
FIG. 7 schematically illustrates a configuration of an electric vehicle including the auxiliary power supply device according to other embodiment.

As shown in FIG. 7, the generator 70 may be connected to the drive circuit 30 by a fifth supply path L5. The electric power generated by the generator 70 is input to the drive circuit 30 via the fifth supply path L5 while the engine 60 is being driven. The drive motor 40 is driven based on the electric power input thereto via the fifth supply path L5 while the engine 60 is being driven.

When the required power value W is larger than the predetermined power value P, the auxiliary power supply 21 outputs the electric power corresponding to the value by which the required power value W is larger than the predetermined power value P. However, the relationship between the electric power that is output from the auxiliary power supply 21 and the predetermined power value P is not limited to this. When the required power value W is larger than the predetermined power value P, the auxiliary power supply 21 may output electric power smaller than the electric power corresponding to the value by which the required power value W is larger than the predetermined power value P, instead of outputting all the electric power corresponding to the value by which the required power value W is larger than the predetermined power value P. Alternatively, the auxiliary power supply 21 may output electric power larger than the electric power corresponding to the value by which the required power value W is larger than the predetermined power value P. The electric power output from the auxiliary power supply 21 can be set as appropriate.

The required power value W is not limited to the value obtained from the external control device. The electric power input to the drive circuit 30 may be detected by a sensor, and the detected value may be used as the required power value. A peak cut circuit may be provided, and the peak cut circuit may limit the electric power output from the main power supply 11 to the predetermined power value P in the output mode. In this case, the electric power that is output from the main power supply 11 is not determined by the situation, and is limited to the predetermined power value P by the circuit configuration.

Although a lithium ion battery is used as the main power supply 11, the main power supply 11 may be any secondary power supply that can be charged with electric power, and can discharge electric power, and may be another secondary battery such as a lithium ion polymer battery, a nickel hydride battery, a nickel cadmium battery, or a lead storage battery.

Although a lithium ion capacitor is used as the auxiliary power supply 21, the auxiliary power supply 21 may be any power supply that can be charged with electric power and can discharge electric power, and may be another capacitor such as an electric double layer capacitor. The auxiliary power supply 21 may be a secondary battery such as a lithium ion battery, a lithium ion polymer battery, a nickel metal hydride battery, a nickel cadmium battery, or a lead storage battery.

The drive motor 40 may be a three-phase brushless motor or a motor with a brush. The engine 60 is not limited to the gasoline engine and may be another engine such as a diesel engine, an engine using hydrogen fuel, or an engine using a fuel cell.

The electric vehicle 1 is a range extender electric vehicle. However, the electric vehicle 1 may be an electric vehicle in which at least one of the main power supply 11 and the auxiliary power supply 21 is charged by plug-in charging. That is, the electric vehicle 1 may be an electric vehicle in which the engine 60 and the generator 70 are not provided.

What is claimed is:

1. An auxiliary power supply device configured to be mounted in an electric vehicle including a drive motor configured to generate a driving force required for the electric vehicle to travel, and a main power supply configured to output electric power to the drive motor such that the electric vehicle travels, the auxiliary power supply device comprising:
    a first supply path connecting the main power supply and the drive motor;
    an auxiliary power supply configured to output the electric power along a flow of the electric power from the main power supply to the drive motor;
    a step-up circuit that steps up a voltage of the electric power, the step-up circuit connecting the auxiliary power supply to the first supply path;
    a switch that switches the electric power output from the main power supply between the first supply path where the main power supply and the auxiliary power supply are in parallel via the step-up circuit and a second supply path where the main power supply is connected directly to the auxiliary power supply in series; and
    an auxiliary power supply control unit configured to switch a mode of the auxiliary power supply to an output mode or a non-output mode when the electric power is output from the main power supply to the drive motor, the output mode being a mode in which the main power supply and the auxiliary power supply are connected in series by the switch and the electric power is output from the auxiliary power supply, and the non-output mode being a mode in which the main power supply and the auxiliary power supply are in connected parallel by the switch and the electric power is not output from the auxiliary power supply,
    wherein the auxiliary power supply control unit is configured to switch the mode to the non-output mode when a required power value required by the drive motor is equal to or smaller than a predetermined power value and to switch the mode to the output mode when the required power value is larger than the predetermined power value, the predetermined power value being set to a value smaller than outputtable electric power that is electric power outputtable from the main power supply.

2. The auxiliary power supply device according to claim 1, wherein in the non-output mode, the auxiliary power supply is charged with the electric power output from the main power supply.

3. The auxiliary power supply device according to claim 1, wherein in the non-output mode, the auxiliary power supply is charged with the electric power that is generated by a generator based on operation of an engine.

4. An electric vehicle comprising:
    the auxiliary power supply device according to claim 1;
    a main power supply device including the main power supply and a main power supply control unit configured to control output of the electric power from the main power supply to the drive motor; and
    the drive motor.

5. The electric vehicle according to claim 4, further comprising:
    an engine; and
    a generator configured to generate the electric power based on operation of the engine, wherein at least one of the main power supply and the auxiliary power supply is charged with the electric power generated by the generator.

6. The auxiliary power supply device according to claim 1, wherein
    the non-output mode includes a charging mode and a non-charging mode, and
    in the charging mode, a portion of the electric power output from the main power supply charges the auxiliary power supply.

7. The auxiliary power supply device according to claim 1, wherein the auxiliary power supply is a lithium ion capacitor.

* * * * *